United States Patent Office 3,468,881
Patented Sept. 23, 1969

3,468,881
ALLYLIC AMINES
Jacob Szmuszkovicz, Kalamazoo, Mich., assignor to The Upjohn Company, Kalamazoo, Mich., a corporation of Michigan
No Drawing. Filed Aug. 15, 1966, Ser. No. 572,231
Int. Cl. C07d 41/08, 29/00, 27/00
U.S. Cl. 260—240                        6 Claims

ABSTRACT OF THE DISCLOSURE

Allylic amines, having anti-depressive action of the Formula II:

II 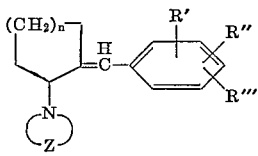

wherein $n$ is 1 to 4;

is a heterocyclicamino group, R', R", R''' are hydrogen or lower alkoxy, and the acid addition salt thereof, are prepared by dehydrating, with an acid having a $pK_a$ value of at least 3.7, the corresponding amine alcohol I:

I 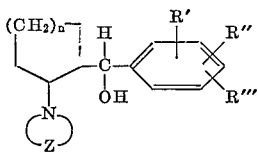

The compounds are useful in the medico-veterinary field, as stimulants of the central nervous system and can be administered to mammals and birds.

---

This invention relates to new organic compounds and is more particularly concerned with certain allylic amines, the acid addition salts thereof and a process of production thereof.

The novel compounds (II) and the process of invention can be illustratively represented by the following formulae:

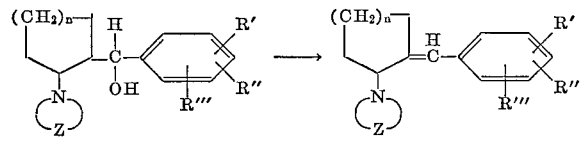

wherein $n$ has the value of 1 to 4, inclusive wherein

is selected from the group consisting of pyrrolidino, piperidino, morpholino, 4-methylpiperazino and hexahydro-1H-azepin-1-yl (hexamethyleneimino), and wherein R', R" and R''' are selected from the group consisting of hydrogen and alkoxy in which the alkyl group of alkoxy has from 1 to 4 carbon atoms, inclusive.

The invention further includes the novel compounds of Formula II when in the form of acid addition salts with inorganic and organic acids.

Examples of the cycloalkyl radical illustratively represented by the formula:

are cyclopentyl, cyclohexyl, cycloheptyl and cyclooctyl.

Illustrative examples of alkyl groups having from 1 to 4 carbon atoms are methyl, ethyl, propyl, isopropyl, butyl, isobutyl, and tertiary butyl.

The process of the present invention comprises: treating a 1,3-aminoalcohol of Formula I with an organic or inorganic acid to dehydrate the alcohol and thus to provide the allylic amine of Formula II above.

The amino function in compounds of Formula II permits the transformation of these compounds, by neutralization with inorganic and organic acids, into acid addition salts such as the hydrochloride, hydrobromide, hydroiodide, sulfate, phosphate, perchlorate, pamoate, cyclohexanesulfamate, methanesulfonate, ethanesulfonate, p-toluenesulfonate, benzenesulfonate, tartrate, citrate, lactate, and the like.

The new allylic amines of Formula II have pseudochol inesterase inhibitory activity and stimulate the central nervous system. These compounds may be administered to mammals and birds by both oral and parenteral routes in order to produce their pharmacological effects. For oral administration, the new compounds of Formula II, as well as the acid addition salts, can be compounded into solid and liquid unit dosage forms, such as tablets, capsules, powders, granules, syrups, elixirs and the like, containing the appropriate amounts for treatment. For tablets, common pharmaceutically acceptable carriers are used such as starch, lactose, kaolin, dicalcium phosphate and the like. These compounds (II) can also be given as powders, particularly in gelatin capsules with or without carrier such as methylcellulose, magnesium stearate, talc and the like. For fluid preparations, these compounds may be dissolved or suspended in aqueous alcoholic vehicles with or without buffering agents and flavoring mixtures.

The thus-obtained pharmaceutical formulations are administered, e.g., to depressed animals such as domestic pet animals which have been transferred from one owner to another.

Certain acid addition salts of compounds of Formula II can also be used for purposes completely different from those in the medical-veterinary field. For example, the fluosilicates of compounds of Formula II are useful mothproofing agents according to U.S. Patents 1,915,334 and 2,075,359. The thiocyanic acid addition salts of the same compounds can be condensed with formaldehyde to form resinous polymers, which according to U.S. Patents 2,425,320 and 2,606,155 are useful as pickling inhibitors. The trichloroacetic acid addition salts of the compounds of Formula II are useful as herbicides, for example, against Johnson grass, yellow foxtail, green foxtail, Bermula grass and quack grass.

The Formula I starting materials for the preparation of the compounds of Formula II are produced as shown in the Preparations.

In carrying out the process of the present invention, the starting materials of Formula I are dehydrated with an acid selected from inorganic and organic acids having a $pK_a$ value of at least 3.7. Such acids include sulfuric acid, hydrochloric acid and hydrogen chloride (gaseous), hydrogen bromide, hydrogen iodide, perchloric acid, trifluoroacetic acid, trichloroacetic acid, formic acid, p-toluenesulfonic acid, benzenesulfonic acid, p-chlorobenzenesulfonic acid, methanesulfonic acid, ethanesulfonic acid and the like. The process is generally carried out at a temperature between 0° and 100° C. After the reaction is completed, the mixture is poured into water and neutralized, usually with an aqueous or alcoholic base, e.g., aqueous or ethanolic sodium or potassium hydroxide, aqueous barium hydroxide or the like. The free amino compound of Formula II is generally recovered by extraction with water-immiscible solvents, e.g., ether, Skellysolve B hexanes, benzene, toluene, methylene chloride, chloroform or the like, and purified in conventional manner, e.g., by crystallization, chromatography or by converting the amine to an acid addition salt, and obtaining the purified amine by treating the acid addition salt with a base.

The following examples and preparations are illustrative of the process and the products of the present invention, but are not to be construed as limiting.

PREPARATION 1

*2-(3,4,5-trimethoxybenzoyl)cyclohexanone*

A mixture of 147 g. (1.5 moles) of cyclohexanone and 213.3 g. (3 moles) of pyrrolidine was refluxed in 2250 ml. of benzene in a flask equipped with an azeotropic separator. After the water formed during the reaction was collected the solution was evaporated to dryness in vacuo and the resulting crude oil consisting of 1-pyrrolidino-1-cyclohexene, was used directly for the next step.

A solution of 3,4,5-trimethoxybenzoyl chloride (138.3 g.; 0.6 mole) in 240 ml. of chloroform was added during a period of 2 hours to a solution of the crude 1-pyrrolidino-1-cyclohexene in 630 ml. of chloroform under a nitrogen atmosphere, with continuous stirring while keeping the temperature between 5 to 10° C. After the solution was stirred overnight (about 18 hours) at room temperature (about 22 to 25° C.), there was added 900 ml. of 10% aqueous hydrochloric acid, and the resulting mixture was stirred at room temperature for 2 hours. The aqueous layer was extracted with two 150-ml. portions of chloroform, and the chloroform extracts were combined with the chloroform layer above. The combined extracts were washed with water, saturated aqueous sodium bicarbonate solution, water and saturated salt solution. The thus-obtained chloroform solution was dried by passing it through anhydrous sodium sulfate and the dry solution was evaporated to give a residue which was crystallized from methanol to yield 100 g. of long, colorless needles of 2-(3,4,5-trimethoxybenzoyl)cyclohexanone of melting point 141–142° C.

*Analysis.*—Calcd. for $C_{16}H_{20}O_5$: C, 65.74; H, 6.90. Found: C, 65.48; H, 6.84.

PREPARATION 2

*2-(3,4,5-trimethoxybenzoyl)cyclopentanone*

A mixture of 126 g. (1.5 moles) of cyclopentanone and 213.3 g. (3 moles) of pyrrolidine was refluxed in 2250 ml. of benzene in a flask equipped with an azeotropic separator. After the calculated amount of water, produced during the condensation had been collected, the reaction mixture was evaporated to give as an oil 1-pyrrolidino-1-cyclopentene.

A solution of 3,4,5-trimethoxybenzoyl chloride (138.3 g.; 0.6 mole) in chloroform was added to a chloroform solution of the oily 1-pyrrolidino-1-cyclopentene over a period of 1 hour. The reaction mixture was thereupon worked up as in Preparation 1 to give a brown oil weighing 190 g. This oil was dissolved in 500 ml. of ethanol and the ethanol solution was added to a solution of 172 g. of cupric acetate monohydrate in 2600 ml. of water. The mixture was stirred for ½ hour, cooled and filtered, providing a crude copper complex of 2-(3,4,5-trimethoxybenzoyl)cyclopentanone. This product crystallized from methylene chloride to give 70 g. of the pure copper complex melting at 206–208° C.

*Analysis.*—Calcd. for $C_{30}H_{34}CuO_{10}$: C, 58.29; H, 5.54; Cu, 10.28. Found: C, 58.58; H, 5.81; Cu, 9.49.

The thus-obtained copper complex (70 g.) was dissolved in 350 ml. of chloroform and decomposed with 670 ml. of 10% aqueous hydrochloric acid to give 60 g. (yield 36%) of 2-(3-4,5-trimethoxybenzoyl)cyclopentanone having a melting point of 81–86° C. A sample of this material was recrystallized from Skellysolve B hexanes to give 2-(3,4,5-trimethoxybenzoyl)cyclopentanonen of melting point 92–95° C.

*Analysis.*—Calcd. for $C_{15}H_{18}O_5$: C, 64.73; H, 6.52. Found: C, 64.95; H, 6.52.

In a run twice the size of the above synthesis, a yield of 47% was obtained.

PREPARATION 3

*2-(3,4,5-trimethoxybenzoyl)cycloheptanone*

A mixture of 500 g. of cycloheptanone (4.5 moles), 785 g. of morpholine (9 moles), 900 ml. of toluene and 5 g. of p-toluenesulfonic acid was refluxed for 23 hours, collecting the water produced in the reaction with an azeotropic separator. Ninety-eight ml. of a lower phase was collected and discarded. The remaining mixture was then evaporated in vacuo to give an oil which was distilled. The fraction boiling between 119–125° C. consisted essentially of 262.7 g. of 1-morpholino-1-cycloheptene (32% yield).

In the manner given in Preparation 1, 3,4,5-trimethoxybenzoyl chloride (92.5 g.; 0.4 mole) was reacted with 181.37 g. (1 mole) of 1-morpholino-1-cycloheptene. The crude product was crystallized from 500 ml. of methanol and gave a first crop of 26 g. of 2-(3,4,5-trimethoxybenzoyl)cycloheptanone of melting point 99–100° C. After two more recrystallizations from methanol, the product had a melting point of 107–108° C.

*Analysis.*—Calcd. for $C_{17}H_{22}O_5$: C, 66.65; H, 7.24. Found: C, 66.16; H, 7.48.

From the above methanolic filtrate another 48.3 g. of 2-(3,4,5-trimethoxybenzoyl)cycloheptanone was obtained as a second crop. The total yield was 61%.

PREPARATION 4

*2-(p-methoxybenzoyl)cyclohexanone*

A solution of 167 g. (0.98 mole) of p-anisoyl chloride in 480 ml. of chloroform was added during a period of 1.5 hours to a solution of 371.7 g. (2.46 moles) of distilled 1-pyrrolidino-1-cyclohexene in 1260 ml. of chloroform. The temperature was kept between 5–10° C. by cooling with ice. After stirring for a period of about 20 hours at room temperature, the mixture was decomposed by addition of 1800 ml. of 10% aqueous hydrochloric acid over a period of 20 minutes. The mixture was then stirred for 2 hours, allowed to settle, the organic layer was separated and the aqueous layer extracted twice with 250-ml. portions of chloroform. The original organic layer and the chloroform extracts were combined, washed with water, saturated salt solution, and then dried by passage through sodium sulfate and evaporated. The residue resulting from the above evaporation was a brown oil which was dissolved in 1 l. of ethanol and added to a solution of 344 g. of cupric acetate monohydrate in 5200 ml. of water, preheated to 65° C. The mixture was stirred for 0.5 hour, cooled to room temperature and filtered. The obtained precipitate was washed with water and then with ether. It was then dissolved in 800 ml. of chloroform and added to a solution of 300 ml. of concentrated hydrochloric acid in 1100 ml. of water. The mixture was stirred for 1 hour. The organic layer was separated, and the aqueous layer was extracted once with chloroform. The combined chloroform original layer and extract were washed with water, saturated salt solution, dried by passing through anhydrous sodium sulfate and evaporated to give a solid which was crystallized from 7 l. of methanol, yielding 136.5 g. of 2-(p-methoxybenzoyl)cyclohexanone having a melting point of 115–128° C. A second crop of 26 g., melting point 116–127° C., was obtained from the mother liquor; the total yield was 71%. A recrystallized sample from methanol of 2-(p- methoxybenzoyl)cyclohexanone had a melting point of 117–122° C.

*Analysis.*—Calcd. for $C_{14}H_{16}O_3$: C, 72.39; H, 6.94. Found: C, 72.30; H, 7.05.

PREPARATION 5

*2-(p-methoxybenzoyl)cyclopentanone*

In the manner given in Preparation 2, 204 g. (1.2 moles) of p-anisoyl chloride was reacted with 1-pyrrolidino-1-cyclopentene prepared from 252 g. (3 moles) of cyclopentanone. The crude product was converted to the copper complex as in Preparation 4, the complex being crystallized from chloroform-ether to give 80 g. of copper complex of 2-(p-methoxybenzoyl)cyclopentanone with a melting point of 252° C. (dec.). The copper complex was decomposed with hydrochloric acid to give 67 g. of an oil which was crystallized from methanol to give 13.9 g. of 2-(p-methoxybenzoyl)cyclopentanone of melting point 82–83° C. The filtrate from the first crystallization was evaporated to dryness and the residue crystallized from ether-Skellysolve B hexanes to give 30.1 g. of a second crop of 2-(p-methoxybenzoyl)cyclopentanone of melting point 76–77° C. (total yield 17%). Two recrystallizations from methanol gave 2-(p-methoxybenzoyl)cyclopentanone having a melting point of 83–87° C.

*Analysis.*—Calcd. for $C_{13}H_{14}O_3$: C, 71.54; H, 6.47. Found: C, 71.83; H, 6.48.

PREPARATION 6

*2-(p-ethoxybenzoyl)cyclohexanone*

In the manner given in Preparation 2, 1-piperidino-1-cyclohexene was reacted with p-ethoxybenzoyl chloride in chloroform solution ot give, after the copper complex purification procedure (Preparation 2), 2-(p-ethoxybenzoyl)cyclohexanone.

PREPARATION 7

*2-(o-methoxybenzoyl)cyclohexanone*

In the manner given in Preparation 2, 1-piperidino-1-cyclohexene was reacted with o-methoxybenzoyl chloride in chloroform solution to give, after the copper complex purification procedure (Preparation 2), 2-(o-methoxybenzoyl)cyclohexanone of melting point 65–68° C.

PREPARATION 8

*2-(p-ethoxybenzoyl)cyclooctanone*

In the manner given in Preparation 2, 1-morpholino-1-cyclooctene was reacted with p-ethoxybenzoyl chloride in chloroform solution to give, after the copper complex purification procedure (Preparation 2), 2-(p-ethoxybenzoyl)cyclooctanone.

PREPARATION 9

*2-(2,3,4-trimethoxybenzoyl)cyclooctanone*

In the manner given in Preparation 2, 1-piperidino-1-cyclooctene was reacted with 2,3,4-trimethoxybenzoyl chloride in chloroform solution to give, after the copper complex purification procedure (Preparation 2), 2-(2,3,4-trimethoxybenzoyl)cyclooctanone.

In the same manner given in the foregoing preparations, other 2-benzoylcycloalkanones are prepared by reacting a 1 - cyclicamino - 1 - cycloalkene, wherein the cycloalkene moiety has from 5 to 8 nuclear carbon atoms, inclusive, and the cyclicamino moiety has from 5 to 10 nuclear atoms, inclusive, with a selected benzoyl chloride. Representative starting materials, thus prepared, include: 2-(3,5 - dimethoxybenzoyl)cyclopentanone; 2-(p-butoxybenzoyl)cyclohexanone; 2-(m-propoxybenzoyl)cycloheptanone; 2-(o-propoxybenzoyl)cyclooctanone; 2-(2,4-diethoxybenzoyl)cyclooctanone; 2-(p - isopropoxybenzoyl) cyclohexanone; 2-(m-isobutoxybenzoyl)cyclopentanone; and the like.

PREPARATION 10

*3,4,5-trimethoxyphenyl 2-piperidino-1-cyclohexen-1-yl ketone*

A mixture consisting of 35 g. (0.12 mole) of 2-(3,4,5-trimethoxybenzoyl)cyclohexanone, 30.6 g. (0.36 mole) of piperidine, 960 ml. of toluene, and 0.8 g. of p-toluenesulfonic acid was refluxed for 23 hours under nitrogen using an azeotropic separator (during this time 1.8 ml. of water was collected). The mixture was thereupon evaporated to dryness to give partially crystalline 3,4,5-trimethoxyphenyl 2-piperidino-1-cyclohexen-1-yl ketone.

PREPARATION 11

*α-(3,4,5-trimethoxyphenyl)-2-piperidinocyclohexanemethanol and its hydrochloride*

A solution of 3,4,5-trimethoxyphenyl 2-piperidino-1-cyclohexen-1-yl ketone [prepared from 35 g. of 2-(3,4,5-trimethoxybenzoyl)cyclohexanone and 30.6 g. of piperidine as in Preparation 10] in 300 ml. of ethanol was hydrogenated in the presence of 1.2 g. of platinum oxide at an initial pressure of 50.1 pounds of hydrogen. Two molar equivalents of hydrogen were taken up during 3.5 hours. The mixture was filtered through a filter aid and evaporated to dryness. The oily residue was dissolved in 400 ml. of ether and 400 ml. of 10% aqueous hydrochloric acid was addad. The thus-obtained reaction mixture was stirred for 0.5 hour. A suspension was obtained which was filtered, yielding an "original filtrate" and a solid which was washed with ether. The solids was twice recrystallized from methanol to give 14.7 g. of α-(3,4,5-trimethoxyphenyl)-2-piperidinocyclohexanemethanol hydrochloride of melting point 265–266° C. An analytical sample, prepared by additional recrystallization from methanol had a melting point of 266–267° C.

Ultraviolet: sh. 228 (8,100); sh. 232; λ max. 269 (825); sh. 278 (612).

*Analysis.*—Calcd. for $C_{21}H_{33}NO_4 \cdot HCl$: C, 63.06; H, 8.57; Cl, 8.87; N, 3.50. Found: C, 62.99; H, 8.24; Cl, 8.66; N, 3.46.

The above "original filtrate" was separated into layers, the aqueous layer was extracted with ether and then basified and extracted with methylene chloride. The extract was washed with water and saturated salt solution, then dried by pouring through anhydrous sodium sulfate and the water-free solution was evaporated to give 5.0 g. of an oil. The oil was converted to the hydrochloride with ethereal hydrogen chloride to give a second crop of 0.7 g. of α-(3,4,5-trimethoxyphenyl)-2-piperidinocyclohexanemethanol hydrochloride (total yield 32%; 15.4 g.).

PREPARATION 12

*3,4,5-trimethoxyphenyl 2-morpholino-1-cyclohexene-1-yl ketone*

In the manner given in Preparation 10, 8.75 g. of 2-(3,4,5-trimethoxybenzoyl)cyclohexanone, 7.84 g. of morpholine, 240 ml. of benzene and 0.2 g. of p-toluenesulfonic acid was refluxed under nitrogen for a period of 23 hours whereby 0.49 ml. of water was collected. The solution was evaporated and the material worked up as in Preparation 10 to give 3,4,5-trimethoxyphenyl 2-morpholino-1-cyclohexen-1-yl ketone.

PREPARATION 13

*α-(3,4,5-trimethoxyphenyl)-2-morpholinocyclohexanemethanol and its hydrochloride*

A solution of 3,4,5-trimethoxyphenyl 2-morpholino-1-cyclohexen-1-yl ketone [produced as in Preparation 12 from 8.75 g. of 2-(3,4,5-trimethoxybenzoyl)cyclohexanone] in 100 ml. of ethanol was hydrogenated in the presence of 0.3 g. of platinum oxide catalyst at an initial hydrogen pressure of 52.5 pounds. Two molar equivalents of hydrogen were taken up during a period of 6 hours. The mixture was filtered through diatomaceous earth (Filtercel) and evaporated to dryness. The resulting oil was dissolved in 100 ml. of 10% aqueous hydrochloric acid, 100 ml. of ether was added and the mixture was stirred for ½ hour. The aqueous layer was extracted twice with two 50-ml. portions of ether. The ether extracts were combined, washed with water, then with saturated salt solution, and finally dried by passage through anhydrous sodium sulfate. The thus-obtained solution was evaporated to give 2.3 g. of an oily material which after crystallization from ether gave 1 g. of 1-(3,4,5-trimethoxybenzoyl)-1-cyclohexene of melting point 73–74° C.

The above aqueous layer was cooled in ice, basified by adding sodium hydroxide solution and extracted with methylene chloride (three portions of 100 ml.). The extracts were combined, washed with water and saturated salt solution, and dried by passing through anhydrous sodium sulfate. The thus-obtained solution was concentrated to give 7.89 g. of an oily material which was converted to the hydrochloride by adding a solution of hydrogen chloride in ether. The solid thus obtained was recrystallized from methanol-ether to give 5 g. (42% yield) of α-(3,4,5-trimethoxyphenyl)-2-morpholinocyclohexanemethanol hydrochloride of melting point 205–206° C.

Ultraviolet: sh. 228 (8,150); sh. 236 (6,350); λmax. 269 (788); sh. 278 (555).

Analysis.—Calcd. for $C_{20}H_{31}NO_5 \cdot HCl$: C, 59.76; H, 8.03; Cl, 8.82; N, 3.49. Found: C, 59.81; H, 8.52; Cl, 8.52; N, 3.57.

PREPARATION 13A

*3,4,5-trimethoxyphenyl 2-(4-methyl-1-piperazinyl)-1-cyclohexen-1-yl ketone*

A mixture of 8.75 g. (0.03 mole) of 2-(3,4,5-trimethoxybenzoyl)cyclohexanone, 9 g. (0.09 mole) of N-methylpiperazine, 240 ml. of toluene and 0.2 g. of p-toluenesulfonic acid was refluxed in a nitrogen atmosphere for a period of 7 hours. After 7 hours, 0.6 ml. of water had been collected in a azeotropic separator. The reaction mixture was thereupon evaporated to dryness to give 3,4,5-trimethoxyphenyl 2-(4-methyl-1-piperazinyl)-1-cyclohexen-1-yl ketone.

PREPARATION 13B

*α-(3,4,5-trimethoxyphenyl)-2-(4-methyl-1-piperazinyl) cyclohexanemethanol dihydrochloride*

A solution of 3,4,5-trimethoxyphenyl 2-(4-methyl-1-piperazinyl)-1-cyclohexen-1-yl ketone, prepared from in Preparation 13A, was dissolved in 100 ml. of methanol 8.75 g. of 2-(3,4,5-trimethoxybenzoyl)cyclohexanone as in Preparation 13A, was dissolved in 100 ml. of methanol and then hydrogenated in the presence of 0.3 g. of platinum oxide at an initial pressure of 54 pounds. After 6.5 hours, the hydrogenation became sluggish, therefore, 0.03 mole of acetic acid and 0.3 g. of platinum oxide were added. After another period of 3 hours a total of 2 molar equivalents of hydrogen was absorbed. The mixture was filtered through diatomaceous earth (Filtercel) and evaporated to dryness. The resulting oil was dissolved in 100 ml. of 10% aqueous hydrochloric acid and 100 ml. of ether and the solution was stirred for 0.5 hour. The aqueous layer was extracted with three-50 ml. portions of methylene chloride. The extracts were discarded. The aqueous solution was then basified and extracted with four portions of 50 ml. each of methylene chloride. The methylene chloride extracts were combined, washed with water, and with saturated salt solution, dried by passing through anhydrous sodium sulfate and evaporated to give 5.9 g. of oil. This oil was dissolved in ether and then acidified with 35 ml. of 2 N ethereal hydrogen chloride. The resulting solid was recrystallized from methanol, yielding 4.4 g. (31% yield) of α-(3,4,5-trimethoxyphenyl)-2-(4-methyl-1-piperazinyl)cyclohexanemethanol dihydrochloride hemimethanol solvate of melting point 232–233° C.

Ultraviolet: sh. 228 (8,400); sh. 234.5 (6,850); λmax. 270.5 (980); sh. 278 (915).

Analysis.—Calcd. for $C_{21}H_{34}N_2O_4 \cdot 2HCl \cdot ½CH_3OH$: C, 55.24; H, 8.19; Cl, 15.17; N, 5.99. Found: C, 54.90; H, 8.05; Cl, 15.30; N, 6.58.

The dihydrochloride above (1 g) was treated with the calculated amount of aqueous sodium hydroxide solution and the mixture was extracted with methylene chloride. The methylene chloride extract was evaporated and the thus-obtained residue was recrystallized twice from methanol to give α-(3,4,5-trimethoxyphenyl)-2-(4-methyl-1-piperazinyl)cyclohexanemethanol.

PREPARATION 14

*p-Methoxyphenyl 2-piperidino-1-cyclohexen-1-yl ketone*

In the manner given in Preparation 10, 23.2 g. (0.1 mole) of 2-(p-methoxybenzoyl)cyclohexanone was heated with 25.5 g. (0.3 mole) of piperidine in 800 ml. of toluene in the presence of 0.67 g. of p-toluenesulfonic acid to give p-methoxyphenyl 2-piperidino-1-cyclohexen-1-yl ketone.

PREPARATION 15

*Cis-A-α(p-methoxyphenyl)-2-piperidino cyclohexanemethanol*

A solution of p-methoxyphenyl 2-piperidino-1-cyclohexen-1-yl ketone (obtained from a synthesis of the same scale as shown in Preparation 14) in 300 ml. of ethanol was hydrogenated in the presence of 1 g. of platinum oxide under an initial hydrogen pressure of 51 pounds. Two molar equivalents of hydrogen were absorbed during a period of 2.5 hours. The mixture was filtered through Filtercel diatomaceous earth. The filtrate was then evaporated to dryness and the residue dissolved in 250 ml. of ether. The ether solution upon standing produced crystals which were recovered by filtration and washed with ether. One g. of material was obtained having a melting point 152–168° C. This material after recrystallization from methanol-ether was found to be the p-toluenesulfonic acid salt of cis-A-α-(p-methoxyphenyl)-2-piperidinocyclohexanemethanol of melting point 182–183° C.

Ultraviolet: λ max. 223 (21,800); sh. 256 (705); sh. 262 (980); sh. 268 (1,360); 275 (1,530); 282 (1,280).

Analysis.—Calcd. for $C_{26}H_{37}NO_5S$: C, 65.66; H, 7.84; N, 2.95; S, 6.74. Found: C, 65.27; H, 7.88; N, 2.89; S, 6.86.

The ethereal filtrate above was stirred with 200 ml. of 10% aqueous acetic acid for ½ hour. The aqueous layer was separated, then extracted once with ether, and the ether extract discarded. The aqueous layer was then cooled, basified with aqueous sodium hydroxide solution and extracted with methylene chloride (four portions of 75 ml. each). The extracts were combined, washed with water, saturated salt solution, dried by passing the solution through anhydrous sodium sulfate and evaporated to give 22.5 g. of oily material. This material was recrystallized from petroleum ether to give 21.4 g. (71% yield) of cis - A - α - (p-methoxyphenyl)-2-piperidinocyclohexanemethanol of melting point 78–80° C.

Ultraviolet: λ max. 225 (11,500); 275 (1,500); 283 (1,300).

Analysis.—Calcd. for $C_{19}H_{29}NO_2$: C, 75.20; H, 9.63; N, 4.62. Found: C, 75.17; H, 9.88; N, 4.47.

Treating cis-A-α-(p-methoxyphenyl)-2-piperidinocyclohexanemethanol with ethereal hydrogen chloride gave cis-A - α - (p-methoxyphenyy)-2-piperidinocyclohexanemethanol hydrochloride of melting point 235–236° C.

PREPARATION 16

*Cis-p-methoxyphenyl 2-piperidinocyclohexyl ketone*

A mixture of 139 g. (0.6 mole) of 2-(p-methoxybenzoyl)cyclohexanone, 153 g. (1.8 moles) of piperidine, 4800 ml. of toluene and 4.02 g. of p-toluenesulfonic acid monohydrate was refluxed for 20 hours in a vessel equipped with an azeotropic separator. A total of 10.1 ml. of water was collected. The reaction mixture was evaporated to dryness on a steam bath to give a residue which was dissolved in 1200 ml. of ethanol and the thus-obtained solution was divided into four equal parts. Each part was hydrogenated in the presence of 1.5 g. of platinum oxide at an initial pressure of 50 pounds of hydrogen. Hydrogenation was stopped after the uptake of 1 molar equivalent. The time required for this procedure was 25 minutes to 55 minutes. Thereafter the combined mixture was filtered through diatomaceous earth, and the solution was evaporated to dryness. A deep yellow oil was obtained which was dissolved in 1200 ml. of ether and allowed to stand for 15 minutes. The mixture was thereupon filtered and a precipitate was collected weighing 5.3 g. The ethereal filtrate was stirred with 1 l. of 10% aqueous hydrochloric acid for 45 minutes. The acidic layer was separated, filtered and basified with 20% aqueous sodium hydroxide solution. The resulting oil which solidified after a short time was extracted with methylene chloride (five portions of 200 ml. each), the extracts were combined, washed with water, then with saturated salt solution, dried over anhydrous sodium sulfate and evaporated to give a crude product of 116 g. Recrystallization of this crude product from petroleum ether gave 75 g. (42% yield) of colorless needles of cis-p-methoxyphenyl 2-piperidinocyclohexyl ketone having a melting point of 86–88° C. Further recrystallization from petroleum ether for analytical purposes gave cis-p-methoxyphenyl 2-piperidinocyclohexyl ketone of melting point 86.5–88° C.

Ultraviolet: λ max. 217 (11,850); 273 (15,800); 278 (15,500).

Analysis.—Calcd. for $C_{19}H_{27}NO_2$: C, 75.71; H, 9.03; N, 4.65. Found: C, 76.19; H, 9.19; N, 4.88.

PREPARATION 17

Trans-p-methoxyphenyl 2-piperidinocyclohexyl ketone

A solution of 68.3 g. (0.227 mole) of cis-p-methoxyphenyl-2-piperidinocyclohexyl ketone was refluxed for 68 hours in 683 ml. of piperidine. The reaction mixture was thereupon evaporated to dryness to give 55 g. of a residual oil which was dissolved in 500 ml. of ether and extracted with four portions of 100 ml. each of 10% aqueous acetic acid. The acid extracts were combined, cooled in ice and basified with 20% aqueous sodium hydroxide solution and thereupon extracted with four portions of 150 ml. each of methylene chloride. The methylene chloride extracts were combined, washed with saturated salt solution, dried over anhydrous sodium sulfate and evaporated to give 22 g. of a colorless solid which was crystallized from 150 ml. of petroleum ether (boiling range from 30–60° C.) to give 12.05 g. of trans-p-methoxyphenyl 2-piperidinocyclohexyl ketone of melting point 100–101° C. A second crop of 3.5 g. of the same material was also obtained; a total of 23% yield.

Ultraviolet: λ max. 216 (12,900); 271 (15,350).

Analysis.—Calcd. for $C_{19}H_{27}NO_2$: C, 75.71; H, 9.03; N, 4.65. Found: C, 75.28; H, 8.66; N, 4.62.

The original ether layer above contained also 1-(p-methoxybenzoyl)-1-cyclohexene, a yellow oil boiling at 145–155° C.

Analysis.—Calcd. for $C_{14}H_{16}O_2$: C, 77.75; H, 7.46. Found: C, 77.99; H, 7.57.

Treatment of 3.45 g. of 1-(p-methoxybenzoyl)-1-cyclohexene with 20 ml. of piperidine on the steam bath for a period of 8 hours produced 36 mg. of trans-p-methoxyphenyl 2-piperidinocyclohexyl ketone of melting point 99–101° C.

PREPARATION 18

Cis-A-α-(p-methoxyphenyl)-2-piperidinocyclohexanemethanol

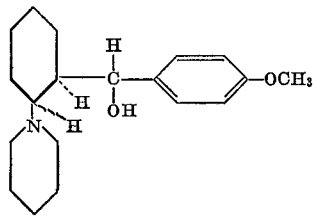

A solution of cis-p-methoxyphenyl 2-piperidinocyclohexyl ketone (3.01 g.; 0.01 mole) in 100 ml. of ethanol was subjected to hydrogenation in the presence of platinum oxide (0.3 g.) at an initial pressure of 53 pounds of hydrogen. One molar equivalent was absorbed in 25 hours. The mixture was filtered, and the filtrate was evaporated to dryness, giving 3.1 g. of an oily material. A 2.9 g. portion of this oil was chromatographed over 150 g. of Florisil (anhydrous magnesium silicate) using 150-ml. portions of an eluant of 6% acetone-94% Skellysolve B hexanes. The first four fractions containing 0.126 g. were discarded. The next eight fractions (150 ml. each) using an eluant of 12% acetone-88% Skellysolve B hexanes gave 2.294 g. of solid melting at 81–82° C. Fractions 13–16 (150 ml. each) using an eluant of 25% acetone-75% Skellysolve B hexanes gave 0.309 g. of solid material melting at 81–82° C. The solids were combined and recrystallized from petroleum ether (boiling range 30–60° C.) to give in two crops 2.4 g. of cis-A-α-(p-methoxyphenyl) - 2 - piperidinocyclohexanemethanol of melting point 81–82.5° C.

Since the carbon atom of the methanol group of α-(p-methoxyphenyl) - 2 - piperidinocyclohexanemethanol is asymmetric, it is obvious that besides the cis-A-alcohol, the cis-B-alcohol is possible.

PREPARATION 19

Cis-A- and cis-B-α-(p-methoxyphenyl)-2-piperidinocyclohexanemethanol

Solid cis-p-methoxyphenyl 2-piperidinocyclohexyl ketone (3.01 g.; 0.01 mole) was added to an ice-cooled solution of sodium borohydride (3 g.) in 100 ml. of ethanol. The reaction mixture was then stirred at room temperature (22–25° C.) for a period of 16 hours. It was evaporated to dryness in vacuo at 40° C. To the residue was added 100 ml. of water, and the mixture was then stirred for 30 minutes. The resulting oil was extracted three times with ether. The ether extracts were combined, washed with water, the water discarded, then washed with four 25-ml. portions of 10% aqueous acetic acid. The acidic extract was washed once with ether, and the ether discarded. It was then cooled in ice and basified with 15% sodium hydroxide solution. The reaction mixture was then extracted three times with ether, the extracts combined, washed with water, then with saturated salt solution, dried over anhydrous sodium sulfate and evaporated to give 3 g. of an oil. The oily material was crystallized from 50 ml. of petroleum ether (boiling range 30–60° C.) to give 1.8 g. of cis-A-α-(p-methoxyphenyl)-2-piperidinocyclohexanemethanol, melting point 78–80° C.

The filtrate was evaporated to dryness, and the residue was chromatographed on 60 g. of Florisil (anhydrous magnesium silicate). The column of Florisil was eluted twice with 150-ml. portions of an eluant consisting of 6% acetone and 94% Skellysolve B hexanes; four times with 150 ml. portions of an eluant consisting of 12% acetone and 88% Skellysolve B hexanes; and finally three times with 150-ml. portions of a 20% acetone-80% Skellysolve B hexanes solution, giving 0.576 g. of cis-A-alcohol, which after recrystallization from petroleum ether had a melting point of 80–81° C. Elution with 50% acetone-50% Skellysolve B hexanes (four portions of 150 ml.

each) and acetone (two portions of 250 ml. each) gave 0.316 g. of cis-B-α-(p-methoxyphenyl)-2-piperidinocyclohexanemethanol, which after recrystallization from ether weigher 0.1 g. and had a melting point of 135–136° C.

These cis alcohols A and B can also be produced from cis-p-methoxyphenyl 2-piperidinocyclohexyl ketone by reduction with lithium aluminum hydride.

PREPARATION 20

Cis-A- and cis-B-α-(p-methoxyphenyl)-2-piperidinocyclohexanemethanol

A solution of 0.9 g. (3 mmoles) of cis-p-methoxyphenyl 2-piperidinocyclohexyl ketone in 25 ml. of ether was added dropwise during 5 minutes to a solution containing 1 g. of lithium aluminum hydride in 100 ml. of ether. The mixture was stirred during a period of 22 hours and was then decomposed by successive addition of 1 ml. of water, 1 ml. of 15% aqueous sodium hydroxide and 3 ml. of water. The resulting suspension was stirred for a period of 2 hours. It was then filtered and the solid washed with ether. The combined filtrate and washings were extracted with three portions of 30 ml. each of 10% aqueous acetic acid, and the combined acidic extracts were back-washed once with ether. The acidic extracts was then basified with 15% aqueous sodium hydroxide and extracted three times with ether. The combined ether extracts were washed with water, saturated salt solution, and dried by passage through anhydrous sodium sulfate. The resulting dried solution was evaporated to give 0.77 g. of a colorless oil. This oil was chromatographed over 35 g. of Florisil (anhydrous magnesium silicate) by eluting with an eluant consisting of 6% acetone and 94% Skellysolve B hexanes. The first four fractions of 150 ml. each gave 0.607 g. (67% yield) of cis-A-α-(p-methoxyphenyl)-2-piperidinocyclohexanemethanol (melting point 80–81° C.). Further elution with an eluant consisting of 12% acetone and 88% Skellysolve B hexanes gave, in four 150-ml. fractions, 0.209 g. of cis-B-α-(p-methoxyphenyl)-2-piperidinocyclohexanemethanol of melting point 134–135° C. (23% yield).

PREPARATION 21

Trans-C-α-(p-methoxyphenyl)-2-piperidinocyclohexanemethanol

In the manner given in Preparatiotn 18, trans-p-methoxyphenyl 2-piperidinocyclohexyl ketone (3.01 g.; 0.01 mole) was hydrogenated in ethanol solution in the presence of 0.5 g. of platinum oxide catalyst at 53 pounds initial hydrogen pressure. The solution after 138 minutes of hydrogenation was filtered through Filtercel diatomaceous earth. The filtrate was evaporated giving 3 g. of a solid of melting point 141–145° C. This solid was crystallized from methanol to give 2.5 g. of colorless needles of trans-C-α-(p-methoxyphenyl)-2-piperidinocyclohexanemethanol of melting point 148–149° C. A second crop of 0.25 g. of product was obtained from the filtrate; the total yield was 91%.

Ultraviolet: 225 (12,150); 275 (1,500); 281 (1,300).
Analysis.—Calcd. for C$_{19}$H$_{29}$NO$_2$: C, 75.20; H, 9.63; N, 4.62. Found: C, 75.18; H, 9.81; N, 4.82.

PREPARATION 22

Trans-D-α-(p-methoxyphenyl)-2-poperidinocyclohexanemethanol

A solution of 0.60 g. (1.98 mmoles) of trans-C-α-(p-methoxyphenyl) - 2 - piperidinocyclohexanemethanol in 4 ml. of trifluoroacetic acid was stirred for 20 minutes. It was cooled in ice, 10 ml. of water was added, followed by 10 ml. of 20% aqueous sodium hydroxide solution. The mixture was thereupon extracted twice with methylene chloride. The combined extract was washed with water, saturated salt solution, dried by passage through anhydrous sodium sulfate and evaporated to give 0.6 g. of a colorless solid of melting point 129–140° C. Crystallization from methanol yielded 0.325 g. of recovered starting material of melting point 145–147° C. The filtrate was evaporated to dryness and the residue was chromatographed over 15 g. of Florisil (anhydrous magnesium silicate). The column containing the Florisil was eluted with 400 ml. of a solution containing 6% acetone and 94% Skellysolve B hexanes. The filtrates from the solution were combined and evaporated, and the residue was recrystallized from petroleum ether (boiling range 30–60° C.) to give 77 mg. of a product melting at 81–82° C., namely trans-D-α-(p-methoxyphenyl)-2-piperidinocyclohexanemethanol.

Ultraviolet: 226 (11,000); 276 (1,650), 282 (1,450).
Analysis.—Calcd. for C$_{19}$H$_{29}$NO$_2$: C, 75.20; H, 9.63; N, 4.62. Found: C, 75.19; H, 9.63; N, 4.55.

PREPARATION 23

α-(3,4,5-trimethoxyphenyl)-2-(hexahydro-1H-azepin-1-yl)cyclohexanemethanol hydrochloride

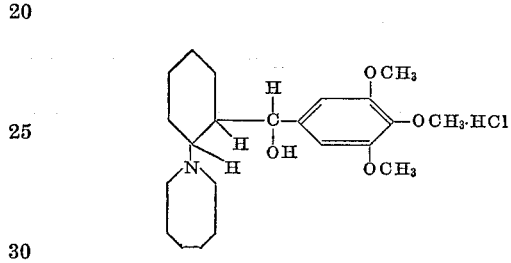

A mixture of 35 g. (0.12 mole) of 2-(3,4,5-trimethoxybenzoyl)cyclohexanone, 35.6 g. (0.36 mole) of hexamethyleneimine, 960 ml. of toluene and 0.8 g. of p-toluenesulfonic acid was refluxed for 7.5 hours in a nitrogen atmosphere in a vessel equipped with an azeotropic separator. A total of 1.8 ml. of water was collected. The mixture was thereupon evaporated to dryness, the residue was dissolved in 250 ml. of ethanol and hydrogenated in the presence of 1.2 g. of platinum oxide at an initial pressure of 51.5 pounds of hydrogen. Two molar equivalents of hydrogen were absorbed during 5 hours. The reaction mixture was then filtered through diatomaceous earth (Filtercel), and the filtrate was evaporated to dryness. The thus-obtained residue was dissolved in 400 ml. of ether. The ether solution was stirred with 400 ml. of 10% hydrochloric acid for 0.5 hour and the resulting suspension was filtered. The obtained solid was washed with ether to give 18.2 g. of material. This material was crystallized from 250 ml. of methanol to give 16.4 g. of α - (3,4,5-trimethoxyphenyl)-2-(hexahydro-1H-azepin-1-yl)cyclohexanemethanol hydrochloride of melting point 244–246° C.

Ultraviolet: sh. 228 (8,250); 268 (757); 276 (608).
Analysis.—Calcd. for C$_{22}$H$_{35}$NO$_4$·HCl: C, 63.83; H, 8.77; Cl, 8.56; N, 3.38. Found: C, 63.95; H, 9.13; Cl, 8.47; N, 3.58.

Workup of the aqueous hydrochloric acid filtrate above provided another 0.7 g. of α-(3,4,5-trimethoxyphenyl)-2-(hexahydro-1H-azepin-1-yl)cyclohexanemethanol hydrochloride of melting point 242–243° C.; thus a total yield of 34%.

PREPARATION 24

Cis-A-α-(p-methoxyphenyl)-2-(hexahydro-1H-azepin-1-yl)cyclohexanemethanol hydrochloride (A) 1-HEXAMETHYLENEIMINO-1-CYCLOHEXENE A mixture of 196 g. (2 moles) of cyclohexanone, 396 g. (4 moles) of hexamethyleneimine, 3 l. of benzene and 2.5 g. of p-toluenesulfonic acid was refluxed for 24 hours, separating 34 ml. of water with an azeotropic separator. Distillation of the material provided 293.7 g. (82% yield) of 1-hexamethyleneimino-1-cyclohexene having a boiling point of 138–140° C. at 16 mm. [this enamine was reported by Nightingale et al., J. Org. Chem. 28, 642 (1963)].

(B) CIS-A-α-(p-METHOXYPHENYL)-2-HEXAHYDRO - 1H-AZEPIN - 1 - YL) - CYCLOHEXANEMETHANOL HYDROCHLORIDE

To a solution of 107.4 g. (0.6 mole) of 1-hexamethyleneimino-1-cyclohexene in 252 ml. of chloroform (purified by passage through basic alumina) was added 60.6 g. (0.6 mole) of triethylamine at a temperature of 5° C. To the reaction mixture was added a solution of 102 g. (0.6 mole) of p-anisoyl chloride in 240 ml. of purified chloroform during a period of 2 hours while keeping the temperature between 5 to 10° C. A suspension resulted which was stirred for a period of about 20 hours at room temperature. The suspensions was thereupon filtered, and the precipitate washed with ether, the ether wash being discarded. The precipitate was 46.8 g. of triethylamine hydrochloride of melting point 253–254° C. The chloroform filtrate was evaporated to dryness. The resulting residue was dissolved in 900 ml. of ethanol and hydrogenated in three portions, each in the presence of 1 g. of platinum oxide at a hydrogen pressure of about 50–52 pounds. After the absorption of about 80% of the hydrogen had taken place, the hydrogenation stopped and another 1 g. of platinum oxide was added. Two molar equivalents of hydrogen were absorbed during 22 hours. The resulting thick suspension was filtered and the precipitate washed with ethanol. The moist cake was refluxed with 1500 ml. of ethanol, filtered, and allowed to crystallize. The first crop of crystals amounted to 80.7 g. of cis-A-α-(p-methoxyphenyl)-2-(hexahydro-1H-azepin - 1 - yl) cyclohexanemethanol hydrochloride of melting point of 230–231° C. A second crop of 20 g. was also collected. Further recrystallization did not change the melting point of the product.

Ultraviolet: $\lambda$ max. 226 (12,150); 276 (1,550); 282 (1,350).

Analysis.—Calcd. for $C_{20}H_{31}NO_2 \cdot HCl$: C, 67.87; H, 9.12; Cl, 10.02; N, 3.97. Found: C, 67.27; H, 9.14; Cl, 9.97; N, 4.03.

PREPARATION 25

α-Phenyl-2-(hexahydro-1H-azepin-1-yl)cyclohexanemethanol hydrochloride

In the manner given in Preparation 24, 0.1 mole of triethylamine, 0.1 mole of 1-hexamethyleneimino-1-cyclohexene and 0.1 mole (14 g.) of benzoyl chloride were reacted, and the reaction product hydrogenated in methanol in the presence of platinum oxide for a period of 2.5 hours. The mixture was filtered, evaporated to dryness and the solid residue was suspended in 200 ml. of ether and 200 ml. of 10% aqueous acetic acid. The mixture was stirred for 0.5 hour and the resulting suspension filtered yielding a solid which was washed with water followed by ether. The thus-obtained product, 3.6 g., was recrystallized from methanol to give 2.8 g. of α-phenyl-2-(hexahydro-1H-azepin-1-yl)cyclohexanemethanol hydrochloride of melting point 276–277° C.

Ultraviolet: $\lambda$ max. 247 (107); 252 (130); 257 (178); 263 (130); 267 (91).

Analysis.—Calcd. for $C_{19}H_{29}NO \cdot HCl$: C, 70.45; H, 9.34; Cl, 10.95; N, 4.33. Found: C, 70.22; H, 8.94; Cl, 11.03; N, 4.45.

PREPARATION 26

α-(3,4-dimethoxyphenyl)-2-(hexahydro-1H-azepin-1-yl)cyclohexanemethanol hydrochloride In the manner given in Preparation 24, 1-hexamethyleneimino-1-cyclohexene was reacted with 3,4-dimethoxybenzoyl chloride (53.6 g.; 0.3 mole) in the presence of triethylamine. The resulting product was hydrogenated in the presence of platinum oxide to give 52.2 g. of α-(3,4-dimethoxyphenyl) - 2 - (hexahydro - 1H - azepin - 1 - yl)cyclohexanemethanol hydrochloride of melting point 225–228° C. in the first crop. Additional material was obtained by the work-up of filtrates with acetic acid and ether. A total yield of about 50% was obtained. The analytical sample, prepared by recrystallization from ethanol, gave α-(3,4-dimethoxyphenyl)-2-(hexahydro-1H-azepin-1-yl)cyclohexanemethanol hydrochloride of melting point 225–226° C.

Ultraviolet: $\lambda$ max. 230 (8,550); 279 (2,950); sh. 285 (2,550).

Analysis.—Calcd. for $C_{21}H_{33}NO_3 \cdot HCl$: C, 65.69; H, 8.93; Cl, 9.24; N, 3.65. Found: C, 65.88; H, 9.19; Cl, 9.30; N, 3.95.

PREPARATION 27

Cis-B-α-(p-methoxyphenyl)-2-(hexahydro-1H-azepin-1-yl)cyclohexanemethanol and the hydrochloride thereof To 240 ml. of trifluoroacetic acid, cooled to 5° C. was added, all at once, 38 g. (0.12 mole) of cis-A-α-(p-methoxyphenyl) - 2 - (hexahydro - 1H - azepin - 1 - yl)cyclohexanemethanol with stirring. The mixture was kept stirring for 20 minutes whereby the temperature reached about 40° C. Thereupon, the solution was cooled, ice was added, followed by 600 ml. of water and then 600 ml. of 20% aqueous sodium hydroxide. The mixture was then extracted with five 200-ml. portions of methylene chloride. The extracts were combined, washed with saturated salt solution, dried by passing through anhydrous sodium sulfate, and the filtrate evaporated to give 37.9 g. of a yellowish oil. This oil was dissolved in 150 ml. of petroleum ether (boiling range 30–60° C.) and allowed to crystallize in the refrigerator overnight; 13.6 g. of crystals were recovered by filtration. These crystals were recrystallized from 50 ml. of ether to give 10.1 g. of cis - B - α - (p - methoxyphenyl) - 2 - (hexahydro - 1H - azepin-1-yl)cyclohexanemethanol of melting point 94–95.5° C.

Ultraviolet: $\lambda$ max. 225 (12,750); 275 (1,550); 281 (1,350).

Analysis.—Calcd. for $C_{20}H_{31}NO_2$: C, 75.67; H, 9.84; N, 4.41. Found: C, 75.86; H, 9.85; N, 4.48.

The hydrochloride of cis-B-α-(p-methoxyphenyl)-2-(hexahydro-1H-azepin-1-yl)cyclohexanemethanol was prepared with 1.5 N ethereal hydrogen chloride. After two crystallizations from methanol-ether, colorless needles were obtained melting at 188–189° C.

Ultraviolet: $\lambda$ max. 226 (12,700); 275 (1,450); 281 (1,250).

Analysis.—Calcd. for $C_{20}H_{31}NO_2 \cdot HCl$: C, 67.87; H, 9.12; Cl, 10.02; N, 3.97. Found: C, 67.24; H, 9.36; Cl, 9.76; N, 3.96.

PREPARATION 28

α-(3,4,5-trimethoxyphenyl)-2-piperidinocycloheptanemthanol hydrochloride (A) 1-PIPERIDINO-1-CYCLOHEPTENE A mixture of 224.2 g. (2 moles) of cycloheptanone, 340 g. (4 moles) of piperidine, 400 ml. of benzene and 2.2 g. of p-toluenesulfonic acid was refluxed for a period of 16 hours in a nitrogen atmosphere, using an azeotropic separator. A total of 5 ml. of water was collected. Since this was less than the calculated amount of water produced during the reaction, the separator was replaced with a Soxhlet extractor containing 322 g. of crystalline sodium aluminum silicate, $Na_{12}$ $[(Al_2O_2)_{12}(SiO_2)_{12}]$ [Linde molecular sieve, Type 4A; see The Merck Index, Merck and Co., Inc. 1960, seventh edition, page 1592], and the mixture was refluxed for three days. After the solvent was removed by distillation from the reaction mixture, 319.7 g. of 1-piperidino-1-cycloheptene of boiling point 130–131° C. at 17 mm. (89% yield) was obtained.

(B) α-(3,4,5-TRIMETHOXYPHENYL)-2-PIPERIDINO-CYCLOHEPTANEMETHANOL HYDROCHLORIDE

In the manner given in Preparation 24, part (B), 23 g. (0.1 mole) of 3,4,5-trimethoxybenzoyl chloride, 17.9 g. (0.1 mole) of 1-piperidino-1-cycloheptene and triethylamine (0.1 mole) were reacted at low temperature in a chloroform solution. The resulting product was hydrogenated in methanol for a period of 3 hours during which 2 molar equivalents of hydrogen were consumed. The resulting reaction mixture was then filtered and evaporated, and the residue stirred with 150 ml. of water and 150 ml. of methylene chloride for a period of 0.5 hour. The methylene chloride layer was separated and stirred with 250 ml. of 10% aqueous hydrochloric acid for ½ hour. The resulting suspension was filtered and the solid washed with water to give 7.5 g. of α-3,4,5-trimethoxyphenyl)-2-piperidinocycloheptane-methanol hydrochloride of melting point 237–238° C. This material was recrystallized from methanol to give α-(3,4,5-trimethoxyphenyl)-2-piperidinocycloheptanemethanol hydrochloride of melting point 243–244° C.

Ultraviolet: sh. 266 (8,250); sh. 234 (6,800); λ max. 270 (782); sh. 278 (546).

*Analysis.*—Calcd. for $C_{22}H_{35}NO_4 \cdot HCl$: C, 63.82; H, 8.77; Cl, 8.57; N, 3.38. Found: C, 63.43; H, 8.85; Cl, 8.66; N, 3.20.

PREPARATION 29

α-*(3,4,5-trimethoxyphenyl)-2-(1-pyrrolidinyl)
cyclohexanemethanol and hydrochloride*

A mixture of 17.5 g. (0.06 mole) of 2-(3,4,5-trimethoxybenzoyl)cyclohexanone, 12.8 g. (0.18 mole) of pyrrolidine and 480 ml. of benzene was refluxed for 1.25 hours using an azeotropic separator; 1.5 ml. of water was collected. The mixture was evaporated to dryness to give a yellow oil. A small sample was crystallized twice from ether to give yellow prisms melting at 118–120° C. and constituting 3,4,5-trimethoxyphenyl 2-(1-pyrrolidinyl)-1-cyclohexen-1-yl ketone.

Ultraviolet: In ether λ max. 262 (11,500); 358 (5,500); in ethanol sh. 220 (17,000); 269 (7,700); 372 (7,050).

*Analysis.*—Calcd. for $C_{20}H_{27}NO_4$: C, 69.54; H, 7.88; N, 4.06. Found: C, 69.91; H, 8.08; N, 3.76.

The crude 3,4,5-trimethoxyphenyl 2-(1-pyrrolidinyl)-1-cyclohexen-1-yl ketone was dissolved in 250 ml. of ethanol and hydrogenated in the presence of 0.6 g. of platinum oxide. Two molar equivalents of hydrogen were taken up in 6 hours. The mixture was then filtered through diatomaceous earth and the filtrate evaporated to dryness. The residue was stirred with 200 ml. of 10% aqueous hydrochloric acid and 250 ml. of ether for 0.5 hour. The aqueous layer was separated, extracted with ether, basified with sodium bicarbonate and extracted with four 125-ml. portions of methylene chloride. The methylene chloride extracts were combined, washed with water, then with saturated salt solution, dried by passing through anhydrous sodium sulfate and evaporated to give 16.5 g. of solid. This solid was recrystallized from ether to give 9.7 g. of α-(3,4,5-trimethoxyphenyl)-2-(1-pyrrolidinyl) cyclohexanemethanol of melting point 121-122° C. A second crop of 2 g. of the alcohol was obtained with a melting point of 119–120° C. The total yield was 56%.

Ultraviolet: sh. 226 (9,200); λ max. 269 (744); sh. 280 (542).

*Analysis.*—Calcd. for $C_{20}H_{31}NO_4$: C, 68.74; H, 8.94; N, 4.01. Found: C, 68.61; H, 8.84; N, 4.17.

In a similar manner 3,4,5-trimethoxyphenyl 2-(1-pyrrolidinyl)-1-cyclohexen-1-yl ketone [prepared from 0.1 mole of 2-(3,4,5-trimethoxybenzoyl)cyclohexanone] was hydrogenated in ethanol in the presence of 1 g. of 5% rhodium on alumina catalyst. The hydrogenation continued for 30 hours. The mixture was then filtered, evaporated to dryness, and the residue was dissolved in ether and treated with ethereal hydrogen chloride to give 5.2 g. of solid. This solid was recrystallized from isopropyl alcohol to give 4.6 g. of α-(3,4,5-trimethoxyphenyl)-2-(1-pyrrolidinyl)-cyclohexanemethanol hydrochloride of melting point 216–217° C.

*Analysis.*—Calcd. for $C_{20}H_{31}NO_4 \cdot HCl$: C, 62.24; H, 8.36; Cl, 9.19; N, 3.63. Found: C, 62.31; H, 8.82; Cl, 9.15; N, 3.65.

PREPARATION 30

*3,4,5 - trimethoxy-α-(2-piperidinocyclopentyl) benzyl alcohol* [α-*(3,4,5-trimethoxyphenyl)-2-piperindiocyclopentanemethanol*]

(A) 3,4,5-TRIMETHOXYPHENYL 2-PIPERIDINOCYCLOPENTYL KETONE

A solution of 15.1 g. (0.1 mole) of 1-piperidino-1-cyclopentene was added, in a nitrogen atmosphere, with ice cooling, to a solution of 10.1 g. (0.1 mole) of triethylamine in 42 ml. of chloroform (purified by passage through a column of basic alumina). To this solution was added a solution of 23.0 g. (0.1 mole) of 3,4,5-trimethoxybenzoyl chloride in 40 ml. of chloroform, over a period of 1.5 hours, while the tempertaure of the reaction mixture was kept at 5–10° C. The mixture was then stirred overnight at room temperature (22–25° C.) and was filtered to give 6.91 g. of triethylamine hydrochloride. The filtrate was evaporated to dryness at 50° C. The residue was dissolved in 250 ml. of ethanol, 12 g. (0.2 mole) of acetic acid and 1 g. of platinum oxide were added and hydrogenation was carried out at an initial pressure of 51 pounds. Two moles of hydrogen were taken up during 1 hour and 28 minutes; more than 90% of the calculated hydrogen was absorbed in the first half hour. The mixture was then filtered and evaporated to dryness. A mixture of 100 ml. of ether and 100 ml. of 10% aqueous hydrochloric acid was added, and the obtained reaction mixture was stirred for 1.5 hours. The layers were separated and the aqueous layer was extracted once with ether. The ether extracts were washed with water to give the "neutral layer." The acidic layer was cooled in ice and basified with 20% aqueous sodium hydroxide. It was extracted twice with ether, the combined ether extract was washed with water, saturated salt solution, dried by passage through anhydrous sodium sulfate and evaporated to give 14.6 g. of a brown oil which solidified on standing in vacuo overnight. The solid was dissolved in 150 ml. of petroleum ether (boiling range between 30–60° C.) and 20 ml. of ether and cooled with ice for 2 hours. The resulting suspension was decanted, thus providing solid A and filtrate B. Filtrate B was evaporated to about half the volume and cooled. The resulting solid, 1.2 g. of melting point 120–130° C., was removed by filtration. Recrystallization of this solid from ether gave colorless needles of melting point 133.5–134.5° C. The melting point of this material was not changed by recrystallization from ether. Ultraviolet, infrared and NMR spectra and also carbon, hydrogen and nitrogen analysis indicated that this product was a mixture.

Solid A and the residue from filtrate B were combined to give 13.3 g. of a yellow solid. This solid was dissolved in 50 ml. of benzene and chromatographed over 400 g. of neutral alumina, taking six benzene fractions of 250 ml. each. Fraction 2 contained 2.278 g. of material which was crystallized from 20 ml. of Skellysolve B hexanes to give 1.5 g. of 3,4,5,-trimethoxyphenyl 2-piperidinocyclopentyl ketone of melting point 79–80° C.

Ultraviolet: λ max. 217 (29,400); 283 (10,700).

*Analysis.*—Calcd. for $C_{20}H_{29}NO_4$: C, 69.13; H, 8.41; N, 4.03. Found: C, 69.21; H, 8.58; N, 4.14.

The above "neutral layer" contained a solid fraction of 8.78 g. which after recrystallization from Skellysolve B hexanes gave 68 g. of cyclopentyl 3,4,5-trimethoxyphenyl ketone of melting point 46–47.5° C.

(B) 3,4,5-TRIMETHOXY-α-(2-PIPERIDINOCYCLOPENTYL)BENZYL ALCOHOL

A solution of 1.2 g. (3.48 mmoles) of 3,4,5-trimethoxyphenyl 2-piperidinocyclopentyl ketone in 25 ml. of ether was added over a period of 5 minutes to a solution of 1.2 g. of lithium aluminum hydride in 100 ml. of ether, and the mixture was stirred for 21 hours. It was then decomposed by successive addition of 1.2 g. of water, 1.2 ml. of 15% aqueous sodium hydroxide and 3.6 ml. of water. The thus-obtained reaction mixture was stirred for a period of 2 hours giving a suspension. This suspension was filtered and the solid washed with ether. The ether washing and the ether filtrate were combined, dried by passage through anhydrous sodium sulfate and evaporated to give 1.2 g. of an oil. The oil was chromatographed over 48 g. of Florisil (anhydrous magnesium silicate). Elution with five 100-ml. portions of a mixture consisting of 10% acetone and 90% Skellysolve B hexanes gave 0.136 g. of an oil. Elution with five portions of 100 ml. each of 20% acetone-80% Skellysolve B hexanes mixture gave 0.582 g. of an oil. After standing in vacuo for one week, the oil crystallized to give a solid of melting point 85–88° C. This solid was recrystallized from ether-petroleum ether to give a 3,4,5-trimethoxy-α-(2-piperidinocyclopentyl)benzyl alcohol melting at 91–92° C.

Ultraviolet: sh. 224 (9,100); sh. 234; sh. 269 (849); sh. 278 (660).

Analysis.—Calcd. for $C_{20}H_{31}NO_4$: C, 68.74; H, 8.94; N, 4.01. Found: C, 68.49; H, 8.98; N, 4.25.

Further elution with 30% acetone-70% Skellysolve B hexanes (five portions of 100 ml. each) gave 0.140 g. and elution with 50% acetone-50% Skellysolve B hexanes mixture (five portions of 100 ml. each) gave 0.170 g. of solids. A 75% acetone-25% Skellysolve B hexanes mixture (five portions of 100 ml. each) gave 0.087 g. and elution with acetone (two portions of 100 ml. each) gave 0.154 g. of solids. These solid fractions were combined and recrystallized from petroleum ether (boiling range 30–60° C.) to give 0.44 g. of crystals, which after recrystallization from a 1:1 mixture of ether-petroleum ether (boiling range of petroleum ether 30–60° C.), gave a material melting at 119–120° C. which was another isomer of 3,4,5-trimethoxy-α-(2-piperidinocylclopentyl)-benzyl alcohol.

PREPARATION 31

*3,4,5-trimethoxy-α-(2-pyrrolidinocyclopentyl) benzyl alcohol [α-(3,4,5-trimethoxyphenyl)-2-pyrrolidinocyclopentanemethanol]*

A mixture of 8.35 g. (0.03 mole) of 2-(3,4,5-trimethoxybenzoyl)cyclopentanone, 6.5 g. (0.09 mole) of pyrrolidine, 240 ml. of benzene and 0.2 g. of p-toluenesulfonic acid was refluxed under a nitrogen atmosphere for 21 hours using an azetropic separator; 0.5 ml. of water was collected. The solution was evaporated to dryness, 3,4,5 - trimethoxyphenyl 2-pyrrolidino-1-cyclopenten-1-yl ketone being obtained as a residue. This residue was dissolved in 100 ml. of methanol and hydrogenated in the presence of 0.3 g. of platinum oxide at an initial pressure of 54 pounds. One molar equivalent of hydrogen was taken up over a period of 4 hours whereupon the hydrogenation was stopped. The mixture was filtered through diatomaceous earth, and the filtrate evaporated to dryness, 3,4,5 - trimethoxyphenyl 2 - pyrrolidinocyclopentyl ketone being obtained as a residue. One-half of this product (5 g.; 0.015 mole) was dissolved in 100 ml. of benzene. This solution was added during 10 minutes to a solution of 5 g. of lithium aluminum hydride in 200 ml. of ether, and the mixture was refluxed with stirring for a period of 3 hours. It was then decomposed by successively adding 5 ml. of water, 5 ml. of 15% aqueous sodium hydroxide and 15 ml. of water. The suspension was filtered, and the solid washed with ether. The filtrate and the ether washings were combined, extracted with 10% hydrochloric acid (four portions of 50 ml. each) and the acidic extracts were basified by the addition of aqueous sodium hydroxide. The basified solution was extracted with four portions (each 50 ml.) of methylene chloride. The methylene chloride extracts were combined, washed with water, then with saturated salt solution, dried by passage through anhydrous sodium sulfate and evaporated to give 4.5 g. of a yellow oil. This yellow oil was dissolved in 20 ml. of methylene chloride and chromatographed over 200 g. of Florisil (anhydrous magnesium silicate). The elution was carried out with five portions of 200 ml. each of 50% acetone-50% Skellysolve B hexanes. The eluates were concentrated to give 0.41 g. of solid which was recrystallized from Skellysolve B hexanes to give 3,4,5-trimethoxy-α-(2-pyrrolidinocyclopentyl)benzyl alcohol of melting point 85–86° C.

Ultraviolet: sh. 227 (9,300); λ max. 269 (788); sh. 278 (573). NMR showed H on carbon bearing the OH as a doublet centered at 316.5 cps. (j.=3 cps.).

Analysis.—Calcd. for $C_{19}H_{29}NO_4$: C, 68.03; H, 8.71; N, 4.18. Found: C, 67.50; H, 8.73; N, 4.43.

Elution of the above column with five portions of 200 ml. each of acetone gave after evaporation 0.58 g. of a solid which was crystallized from ether and thereupon from tetrahydrofuran-Skellysolve B hexanes to give isomeric 3,4,5-trimethoxy-α-(2pyrrolidinocyclopentyl)benzyl alcohol of melting point 147–148° C.

Ultraviolet: sh. 225 (8,950); λ max. 270 (1,100); sh. 227 (567), NMR showed H on carbon bearing the OH as a doublet centered at 291 cps. (j.=5 cps.).

Analysis.—Calcd. for $C_{19}H_{29}NO_4$: C, 68.03; H, 8.71; N, 4.18. Found: C, 67.70; H, 8.90; N, 4.25.

PREPARATION 32

*p-Ethoxyphenyl 2-piperidino-1-cyclohexen-1-yl ketone*

In the manner given in Preparation 10, 2-(p-ethoxybenzoyl)cyclohexanone was reacted with piperidine in the presence of p-toluenesulfonic acid to give p-ethoxyphenyl 2-piperidino-1-cyclohexen-1-yl ketone.

PREPARATION 33

*o-Methoxyphenyl 2-piperidino-1-cyclohexen-1-yl ketone*

In the manner given in Preparation 10, 2-(o-methoxybenzoyl)cyclohexanone was reacted with piperidine in the presence of p-toluenesulfonic acid to give o-methoxyphenyl 2-piperidino-1-cyclohexen-1-yl ketone.

In the manner given in Preparation 10, other keto compounds can be obtained by reacting a 1,3-diketone with a heterocyclic amine in the presence of an acid catalyst, e.g., benzenesulfonic acid, p-toluenesulfonic acid, m-chlorobenzesulfonic acid and the like. Representative compounds thus obtained include: o-methoxyphenyl 2-pyrrolidino-1-cyclohexen-1-yl ketone; p-methoxyphenyl 2-pyrrolidino-1-cyclohexen-1-yl ketone; o-methoxyphenyl 2-morpholino-1-cyclohexen-1-yl ketone; m-methoxyphenyl 2-morpholino - 1 - cyclohexen-1-yl ketone; 3,4-diethoxyphenyl 2-piperidino-1-cyclohexen-1-yl ketone; o-ethoxyphenyl 2-morpholino-1-cyclohepten-1-yl ketone; 2,3,4-trimethoxyphenyl 2-piperidino - 1 - cycloocten-1-yl ketone; phenyl 2-piperidino-1-cyclohexen-1-yl ketone; p-propoxyphenyl 2-(4-methylpiperazino)-1-cyclopenten-1-yl ketone; 3,5-dipropoxyphenyl 2-pyrrolidino-1-cyclohepten-1-yl ketone; p-butoxyphenyl 2-(hexahydro-1H-azepin-1-yl)-1-cyclohepten-1-yl ketone; p-propoxyphenyl 2-(4-methylpiperazino)-1-cycloocten-1-yl ketone; 2,5-dipropoxyphenyl 2-morpholino - 1 - cyclohepten-1-yl ketone; o-isopropoxyphenyl 2-pyrrolidino-1-cyclopenten-1-yl ketone; m-butoxyphenyl 2-piperidino-1-cyclopenten-1-yl ketone; 2,4-dibutoxyphenyl 2-morpholino-1-cycloocten-1-yl ketone; 3,4-dimethoxyphenyl 2-pyrrolidino-1-cyclohepten-1-yl ketone; 3,5-diethoxyphenyl 2-pyrrolidino - 1 - cyclopenten-1-yl ketone; 3,4,5-triethoxyphenyl 2-piperidino-1-cyclohexen-1-yl ketone; 2-butoxyphenyl 2-morpholino-1-cyclohexen-1-yl ketone; 3,4,5-triethoxyphenyl 2-piperidino-1-cycloocten-1-yl ketone; o-methoxyphenyl 2-pyrrolidino-1-cyclopenten-1-yl ketone; phenyl 2-morpholino-1-cycloocten-1-yl ketone; phenyl 2-morpholino-1-cyclohepten-1-yl ketone; and the like.

PREPARATION 34

α-(p-Ethoxyphenyl)-2-piperidinocyclohexane-methanol hydrochloride

In the manner given in Preparation 11, p-ethoxyphenyl 2-piperidino-1-cyclohexen-1-yl ketone was hydrogenated in the presence of platinum oxide to give α-(p-ethoxyphenyl) - 2 - piperidinocyclohexanemethanol recovered as hydrochloride; melting point 221–222° C.

PREPARATION 35

α-(o-Methoxyphenyl)-2-piperidinocyclohexanemethanol hydrochloride

In the manner given in Preparation 11, o-methoxyphenyl 2-piperidino-1-cyclohexen-1-yl ketone was hydrogenated in the presence of platinum oxide to give α-(o-methoxyphenyl) - 2 - piperidinocyclohexanemethanol recovered as hydrochloride.

PREPARATION 36

α-(p-Propoxyphenyl)-2-piperidinocyclohexanemethanol hydrochloride

In the manner given in Preparation 11, p-allyloxyphenyl 2-piperidino-1-cyclohexen-1-yl ketone was hydrogenated in the presence of platinum oxide to give α-(p-propoxyphenyl)-2-piperidinocyclohexanemethanol recovered as hydrochloride.

In the manner given in Preparation 11, other alcohols of Formula I can be prepared by hydrogenation of phenyl (or alkoxyphenyl) 2-cyclicamino-1-cycloalken-1-yl ketones, described in the foregoing preparations, such as cis-α-(p-methoxyphenyl)-2-(4-methylpiperazino)cyclohexanemethanol, melting point 132–133° C.; cis-α-(p-methoxyphenyl) - 2 - morpholinocyclohexanemethanol, melting point 111–112° C.; α-(2,4-dibutoxyphenyl)-2-morpholinocyclooctanemethanol; α-(p-propoxyphenyl)-2 - (4 - methylpiperazino)cyclopentanemethanol; α - (o-ethoxyphenyl) - 2 - morpholinocycloheptanemethanol; α-(3,4 - dimethoxyphenyl)-2-pyrrolidinocycloheptanemethanol; α-(3,5-diethoxyphenyl)-2-pyrrolidinocyclopentanemethanol; and the like.

EXAMPLE 1

1-[2-(p-methoxybenzylidene)cyclohexyl]piperidine and its hydrochloride

A mixture of 26.5 g. of α-(p-methoxyphenyl)-2-piperidinocyclohexanemethanol (0.0875 mole) and 466 ml. of 10% hydrochloric acid was heated on the steam bath for 45 minutes. A cloudy solution resulted. It was filtered through Florisil (anhydrous magnesium silicate) and was allowed to crystallize overnight. The crystals were collected on a filter and washed with cold water to give 18 g. (69% yield) of 1-[2-(p-methoxybenzylidene)cyclohexyl]piperidine hydrochloride of melting point 202–204° C.

*Analysis.*—Calcd. for $C_{19}H_{27}NO \cdot HCl$: C, 70.90; H, 8.77; Cl, 11.02; N, 4.35. Found: C, 70.86; H, 8.89; Cl, 10.73; N, 4.49.

Ultraviolet: λ max. 259 (19,000).

A portion of 5 g. of 1-[2-(p-methoxybenzylidene)cyclohexyl]piperidine hydrochloride was treated with 10% aqueous sodium hydroxide solution until basic and the resulting mixture was extracted with ether. The ether solution was evaporated to give 1-[2-(p-methoxybenzylidene)cyclohexyl]piperidine.

Treating 1-[2 - (p-methoxybenzylidene)cyclohexyl]piperidine with acids such as hydrobromic acid, sulfuric acid, perchloric acid, trifluoroacetic acid, trichloroacetic acid, methanesulfonic acid, benzenesulfonic aid, p-toluenesulfonic acid and the like, in stoichiometric quantities, produces the corresponding acid addition salts of the free base.

EXAMPLE 2

1-[2-(3,4,5-trimethoxybenzylidene)cyclohexyl]hexahydro-1H-azepine and its hydrochloride To a solution of 31 g. of α-(3,4,5,-trimethoxyphenyl)-2-(hexahydro-1H-azepin-1-yl)cyclohexanemethanol hydrochloride in 350 ml. of water was added 70 ml. of 20% aqueous sodium hydroxide solution. The mixture was thereupon extracted with methylene chloride and the methylene chloride extracts were evaporated to give the free base, α-(3,4,5-trimethoxyphenyl)-2-(hexahydro-1H-azepin-1-yl)cyclohexanemethanol, in the form of an oil.

To this oil was added 140 ml. of concentrated sulfuric acid under continuous stirring and warming to about 30–35° C. The stirring and heating to 35° C. was maintained for 4 hours. The resulting mixture was then added dropwise with stirring into 700 ml. of cooled water, keeping the temperature of the water under 15° C. Precipitation began and after all the mixture had been added to the water, the aqueous mixture was filtered; the solid (A), about 4.0 g., was thus removed.

The filtrate was added to a solution of sodium hydroxide (280 g.) in 1120 ml. of water, keeping the temperature of the mixture with stirring and cooling to about 15° C. To the aqueous mixture was added methylene chloride and then water to dissolve the sodium sulfate which was formed. The organic layer was separated and the aqueous layer was extracted with methylene chloride. The organic layer and the extracts were combined, then washed with water, then with saturated salt solution and filtered through sodium sulfate. The cloudy, pale yelloy solution was evaporated to dryness, leaving an oily residue which was dissolved in 100 ml. of ether and allowed to crystallize overnight. The solid material was removed by filtration. The removed solid (B) had a weight of 1.1 g. and a melting point of 238–243° C.

To the ethereal filtrate from the above crystallization was added 70 ml. of 1.5 N ethereal hydrogen chloride and the resulting solid was removed by filtration and washed with ether. It was recrystallized from a mixture consisting of 100 ml. of methanol and 800 ml. of ether in a refrigerator, providing 19.8 g. (72% yield) of product which after additional recrystallization from methanol gave pure 1-[2-(3,4,5-trimethoxybenzylidene)cyclohexyl] hexahydro-1H-azepinehydrochloride of melting point 193–194° C.

Ultraviolet: λ max. 216 (31,300); 261 (12,800).

*Analysis.*—Calcd. for $C_{22}H_{33}NO_3 \cdot HCl$: C, 66.33; H, 8.66; Cl, 8.96; N, 3.54. Found: C, 66.52; H, 8.96; Cl, 8.95; N, 3.44.

The first-obtained solid (A), after recrystallization from 1750 ml. of methanol, gave α-[2-(hexahydro-1H-azepin-1-yl)cyclohexylidene] - 3,4,5 - trimethoxy-o-toluenesulfonic acid of melting point 237–243° C.

*Analysis.*—Calcd. for $C_{22}H_{33}NO_6S$: C, 60.12; H, 7.57; N, 3.19; S, 7.30. Found: C, 60.07; H, 7.66; N, 3.22; S, 7.66.

The second solid (B) was recrystallized twice from methylene chloride-ether (a mixture consisting of 10 ml. of methylene chloride and 40 ml. of ether) to give in colorless needles α-hydroxy-α-[2-(hexahydro-1H-azepin-1-yl)cyclohexyl]-3,4,5-trimethoxy-o-toluenesulfonic acid γ-sultone of melting point 240–242° C. (dec.).

*Analysis.*—Calcd. for $C_{22}H_{33}NO_6S$: C, 60.12; H, 7.57; N, 3.19; S, 7.30. Found: C, 60.31; H, 7.78; N, 3.24; S, 7.36.

Five g. of 1-[2-(3,4,5-trimethoxybenzylidene)cyclohexyl]hexahydro-1H-azepine hydrochloride was treated with dilute aqueous sodium hydroxide solution until the mixture was basic. The mixture was thereupon extracted with ether and the ether solution was evaporated to give a residue which was twice recrystallized from ether-petroleum ether to give colorless needles of the free base, 1-[2 - (3,4,5 - trimethoxybenzylidene)cyclohexyl]hexahydro-1H-azepine of melting point 80–81.5° C.

*Analysis.*—Calcd. for $C_{22}H_{33}NO_3$: C, 73.50; H, 9.25; N, 3.90. Found: C, 73.55; H, 9.47; N, 3.98.

Ultraviolet: λ max. 217 (33,950); 257 (14,300).

EXAMPLE 3

*1-[2-(p-methoxybenzylidene)cyclohexyl]hexahydro-1H-azepine and its hydrochloride*

Trifluoroacetic acid (240 ml.) was added all at once to 38 g. (0.12 mole) of cis-A-α(p-methoxyphenyl)-2-hexahydro-1H-azepin - 1 - yl)cyclohexanemethanol with stirring. The mixture was stirred for 20 minutes while the temperature reached about 40° C. The solution was cooled and ice was added, followed by 600 ml. of water and then 600 ml. of 20% aqueous sodium hydroxide solution. The mixture was extracted with five portions of 200 ml. each of methylene chloride. The organic extracts were washed with saturated salt solution, dried over sodium sulfate and evaporated to give 37.9 g. of a yellow oil. This oil was dissolved in 150 ml. of petroleum ether (boiling range 30–60° C.) and allowed to crystallize in the refrigerator overnight. In this manner was obtained 13.6 g. of material melting at 78–79° C. which upon recrystallization from 50 ml. of ether gave 10.1 g. of cis-B-α-(p-methoxyphenyl)-2-(hexahydro-1H-azepin - 1 - yl)cyclohexanemethanol of melting point 94–95.5° C.

The filtrate which was obtained after removal of the cis-B-alcohol isomer was evaporated to give 27.6 g. of residue which was dissolved in 50 ml. of methylene chloride and chromatographed over 1380 g. of Florisil. Elutions were made with nine portions of 400 ml. each of 12% acetone-88% Skellysolve B hexanes. The nine fractions were combined and evaporated to give 17.67 g. of oil. This oil was reacted with an ether solution of hydrogen chloride to give 19 g. (42.5% yield) of 1-[2-(p-methoxybenzylidene)cyclohexyl]hexahydro - 1H - azepine hydrochloride of melting point 183–185° C. After recrystallization from a mixture consisting of 20 ml. of methanol and 200 ml. of ether, the hydrochloride had a melting point of 184–185° C.

Ultraviolet: λ max. 259 (18,600).

*Analysis.*—Calcd. for $C_{20}H_{29}NO \cdot HCl$: C, 71.51; H, 9.00; Cl, 10.56; N, 4.17. Found: C, 71.40; H, 9.37; Cl, 10.66; N, 4.10.

In the manner given in Example 2, 1-[2-(p-methoxybenzylidene) cyclohexyl]hexahydro-1H-azepine hydrochloride was treated with sodium hydroxide, the mixture extracted with ether, the ether solution dried and evaporated to give the free base 1-[2-(p-methoxybenzylidene) cyclohexyl]hexahydro-1H-azepine.

EXAMPLE 4

*1-[2-(p-ethoxybenzylidene)cyclohexyl]piperidine hydrochloride*

In the manner given in Example 1, α-(p-ethoxyphenyl)-2-piperidinocyclohexanemethanol was dehydrated with 10% hydrochloric acid to give 1-[2-(p-ethoxybenzylidene)cyclohexyl]-piperidene hydrochloride.

EXAMPLE 5

*1-[2-(3,4,5-trimethoxybenzylidene)cyclohexyl] piperidine hydrochloride*

In the manner given in Example 1, α-(3,4,5-trimethoxyphenyl) - 2 - piperidinocyclohexanemethanol was dehydrated with 10% hydrochloric acid to give 1-[2-(3,4,5-trimethoxybenzylidene)cyclohexyl]piperidine hydrochloride.

EXAMPLE 6

*4-[2-(3,4,5-trimethoxybenzylidene)cyclohexyl]-morpholine hydrochloride*

In the manner given in Example 1, α-(3,4,5-trimethoxyphenyl) - 2 - morpholinocyclohexanemethanol was dehydrated with 10% hydrochloric acid to give 4-[2-(3,4,5-trimethoxybenzylidene) cyclohexyl]morpholine hydrochloride.

EXAMPLE 7

*1-[2-(methoxybenzylidene)cyclohexyl]piperidene hydrochloride*

In the manner given in Example 1, trans-C-α-(p-methoxyphenyl) - 2 - piperidinocyclohexanemethanol was dehydrated with 10% hydrochloric acid to give 1-[2-(p-methoxybenzylidene)cyclohexyl]piperidine hydrochloride (identical with the product of Example 1).

EXAMPLE 8

*1-[2-(p-methoxybenzylidene)cyclohexyl]piperidine hydrochloride*

In the manner given in Example 1, trans-D-α-(p-methoxyphenyl) - 2 - piperidinocyclohexanemethanol was dehydrated with 10% hydrochloric acid to give 1-[2-(p-methoxybenzylidene)cyclohexyl]piperidine hydrochloride (identical with the product of Example 1).

In the manner given iin Example 1, cis-A- and cis-B-α-(p-methoxyphenyl) - 2 - piperidinocyclohexanemethanols are dehydrated and converted to 1-[2-(p-methoxybenzylidene)cyclohexyl]piperidene hydrochloride.

EXAMPLE 9

*1-(2-benzylidenecyclohexyl)hexahydro-1H-azepine hydrochloride*

In the manner given in Example 3, α-phenyl-2-(hexahydro-1H-azepin-1-yl)cyclohexanemethanol was dehydrated with trifluoroacetic acid and converted to the hydrochloride with ethereal hydrogen chloride to give 1-(2-benzylidenecyclohexyl)-hexahydro-1H-azepine hydrochloride.

EXAMPLE 10

*1-[2-(3,4-dimethoxybenzylidene)cyclohexyl]hexahydro-1H-azepine hydrochloride*

In the manner given in Example 3, α-(3,4-dimethoxyphenyl)-2-(hexahydro-1H-azepin-1-yl)cyclohexanemethanol was dehydrated with trifluoroacetic acid and converted to the hydrochloride with ethereal hydrogen chloride to give 1-[2-(3,4-dimethoxybenzylidene)cyclohexyl]hexahydro-1H-azepine hydrochloride.

EXAMPLE 11

*1-[2-(3,4,5-trimethoxybenzylidene)cycloheptyl] piperidine hydrochloride*

In the manner given in Example 1, α-(3,4,5-trimethoxyphenyl)-2-piperidinocylcloheptanemethanol was dehydrated with 10% hydrochloric acid to give 1-[2-(3,4,5-trimethoxybenzylidene)cycloheptyl]piperidine hydrochloride.

EXAMPLE 12

*1-[2-(3,4,5-trimethoxybenzylidene)cyclohexyl] pyrrolidine hydrochloride*

In the manner given in Example 1, α-(3,4,5-trimethoxyphenyl) - 2-(1-pyrrolidinyl)cyclohexanemethanol was dehydrated with 10% hydrochloric acid to give 1-[2-(3,4,5-trimethoxybenzylidene)cyclohexyl]pyrrolidine hydrochloride.

EXAMPLE 13

*1-[2-(3,4,5-trimethoxybenzylidene)cyclopentyl] piperidine hydrochloride*

In the manner given in Example 1, α - (3,4,5 - trimethoxyphenyl) - 2 - piperidinocyclopentanemethanol was dehydrated with 10% hydrochloric acid to give 1-[2-(3,4,5-trimethoxybenzylidene)cyclopentyl]piperidine hydrochloride.

EXAMPLE 14

*1-[2-(o-methoxybenzylidene)cyclohexyl]piperidine hydrochloride*

In the manner given in Example 1, α-(o-methoxyphenyl) - 2 - piperidinocyclohexanemethanol was dehydrated with 10% hydrochloric acid to give 1-[2-(o- methoxybenzylidene)cyclohexyl]piperidine hydrochloride.

EXAMPLE 15
1-[2-(p-propoxybenzylidene)cyclohexyl]piperidine hydrochloride In the manner given in Example 1, α-(p-propoxyphenyl) - 2 - piperidinocyclohexanemethanol was dehydrated with 10% hydrochloric acid to give 1-[2-(p-propoxybenzylidene)cyclohexyl]piperidine hydrochloride.

EXAMPLE 16
4-[2-(2,4-dibutoxybenzylidene)cyclooctyl]morpholine hydrochloride In the manner given in Example 1, α-(2,4-dibutoxyphenyl) - 2 - morpholinocyclooctanemethanol was dehydrated with 10% hydrochloric acid to give 4-[2-(2,4-dibutoxybenzylidene)cyclooctyl]morpholine hydrochloride.

EXAMPLE 17
1-[2-(p-propoxybenzylidene)cyclopentyl]-4-methylpiperazine hydrochloride In the manner given in Example 1, α-(p-propoxyphenyl) - 2 - (4-methylpiperazino)cyclopentanemethanol was dehydrated with 10% hydrochloric acid to give 1-[2 -(p - propoxybenzylidene)cyclopentyl] - 4 - methylpiperazine hydrochloride.

EXAMPLE 18
4-[2-(o-ethoxybenzylidene)cycloheptyl]morpholine hydrochloride In the manner given in Example 1, α - (o-ethoxyphenyl - 2 - morpholinocycloheptanemethanol was dehydrated with 10% hydrochloric acid to give 4-[2-(o-ethoxybenzylidene)cycloheptyl]morpholine hydrochloride.

EXAMPLE 19
1-[2-(3,4-dimethoxybenzylidene)cycloheptyl]pyrrolidine hydrochloride In the manner given in Example 1, α-(3,4 - dimethoxyphenyl) - 2 - pyrrolidinocycloheptanemethanol was dehydrated with 10% hydrochloric acid to give 1-[2-(3,4-dimethoxybenzylidene)cycloheptyl]pyrrolidine hydrochloride.

EXAMPLE 20
1-[2-(3,4-diethoxybenzylidene)cyclopentyl]pyrrolidine hydrochloride In the manner given in Example 1, α-(3,4-diethoxyphenyl) - 2 - pyrrolidinocyclopentanemethanol was dehydrated with 10% hydrochloric acid to give 1-[2-(3,5-diethoxybenzylidene)cyclopentyl]pyrrolidine hydrochloride.

In the manner given in the preceding examples, other allylic amines can be produced by dehydrating an alcohol of Formula I with an acid having a pKa of at least 3.7. If these compounds are obtained as hydrochlorides, they can be converted with a base to the free amines. Representative allylic amines, thus produced, include:

4-[2-(3,5-dipropoxybenzylidene)cyclopentyl]morpholine;
1-[2-(o-butoxybenzylidene)cyclohexyl]pyrrolidine;
1-[2-(m-butoxybenzylidene)cyclohexyl]pyrrolidine;
1-[2-(p-butoxybenzylidene)cyclopentyl]pyrrolidine;
4-[2-(o-ethoxybenzylidene)cyclopentyl]morpholine;
1-[2-(m-ethoxybenzylidene)cyclopentyl]-4-methylpiperazine;
1-[2-(p-ethoxybenzylidene)cyclopentyl]-4-methylpiperazine;
1-[2-(p-ethoxybenzylidene)cycloheptyl]-4-methylpiperazine;
1-[2-(3,5-dimethoxybenzylidene)cycloheptyl]pyrrolidine;
1-(2-benzylidenecycloheptyl)pyrrolidine;
1-[2-(2,4-diethoxybenzylidene)cycloheptyl]piperidine;
4-[2-(3,5-dipropoxybenzylidene)cycloheptyl]morpholine;
1-[2-(o-methoxybenzylidene)cycloheptyl]piperidine;
1-[2-(2,4-diethoxybenzylidene)cyclooctyl]piperidine;
4-[2-(o-isopropoxybenzylidene)cyclooctyl]morpholine;
1-[2-(p-isobutoxybenzylidene)cyclooctyl]-4-methylpiperazine;

and the like.

Treating the free allylic amines with inorganic or organic acids, useful salts are obtained, such as the hydrochlorides, hydrobromides, hydroiodides, sulfates, perchlorates, formates, acetates, lactates, tartrates, citrates, maleates, benzoates, trichloroacetates, trifluoroacetates, methanesulfonates, ethanesulfonates, benzenesulfonates, p-toluenesulfonates, p-chlorobenzenesulfonates, p-ethylbenzenesulfonates and the like, of the foregoing amines.

I claim:
1. An allylic amine of the formula:

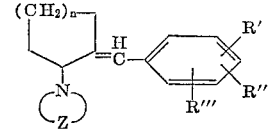

II wherein $n$ has the value of 1 to 4, inclusive; wherein

is selected from the group consisting of pyrrolidino, piperidino, morpholino, 4-methylpiperazino and hexahydro-1H-azepin-1-yl; and wherein R', R" and R''' are selected from the group consisting of hydrogen and alkoxy in which the alkyl group of alkoxy has from 1 to 4 carbon atoms, inclusive; and therapeutically acceptable acid addition salts thereof.

2. The allylic amine hydrochloride of the Formula IIa:

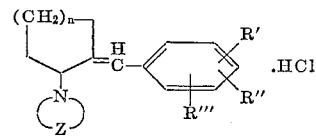

IIa wherein $n$ has the value of 1 to 4, inclusive; wherein

is selected from the group consisting of pyrrolidino, piperidino, morpholino, 4-methylpiperazino and hexahydro-1H-azepin-1-yl; and wherein R', R" and R''' are selected from the group consisting of hydrogen and alkoxy in which the alkyl group of alkoxy has from 1 to 4 carbon atoms, inclusive.

3. The compound according to claim 2, wherein $n=2$;

is piperidino; R' and R" are hydrogen and R''' is p-methoxy and the compound is therefore 1-[2-(p-methoxybenzylidene)cyclohexyl]piperidine hydrochloride.

4. The compound according to claim 1, wherein $n=2$;

is hexahydro-1H-azepin-1-yl; R', R" and R''' are 3-, 4- and 5-methoxy groups, and the compound is therefore 1 - [2 - (3,4,5 - trimethoxybenzylidene)cyclohexyl]hexahydro-1H-azepine.

5. The hydrochloride of the compound of claim 4, namely 1 - [2 - (3,4,5 - trimethoxybenzylidene)cyclohexyl]hexahydro-1H-azepine hydrochloride.

6. The compound according to claim 2, wherein $n=2$;

is hexahydro-1H-azepin-1-yl; R' and R" are hydrogen and R'" is p-methoxy, and the compound is therefore 1-[2-(p-methoxybenzylidene)cyclohexyl]hexahydro - 1H-azepine hydrochloride.

References Cited

Treibs et al.: Chem. Ber., vol 91, pp. 2282 to 2289 (1958).

Chemical Abstracts I, vol. 53, cols. 6147 to 6148 (1959) (abstract of Treibs et al.).

Chemical Abstracts II, vol. 54, col. 10883 (1960) (abstract of Kazanskii et al.).

Opitz et al.: Annalen der Chemie, vol. 665, pp. 112 to 113 (1963).

JOHN D. RANDOLPH, Primary Examiner

U.S. Cl. X. R.

71—88, 92, 94, 95; 252—148, 390; 260—247.7, 268, 294.7, 326.5, 591, 999

UNITED STATES PATENT OFFICE
CERTIFICATE OF CORRECTION

Patent No. 3,468,881               Dated   September 23, 1969

Inventor(s) Jacob Szmuszkovicz

It is certified that error appears in the above-identified patent and that said Letters Patent are hereby corrected as shown below:

Column 2, line 56, for "Bermula" read -- Bermuda --. Column 4, line 2, for "(3-4,5-" read -- (3,4,5- --; line 5, for "benzoyl)cyclopentanonen" read -- benzoyl)cyclopentanone -- Column 5, line 35, for "at" read -- to --. Column 6, line 27, for "addad" read -- added --; line 31, for "solids" read -- solid --; line 53, for "1-cyclohexene" read -- 1-cyclohexen --. Column 7, line 40, for "in a azeotropic" read -- in an azeotropic --; lines 50-52, for "prepared from in Preparation 13A, was dissolved in 100 ml. of methanol 8.75 g. of 2-(3,4,5-" read -- prepared from 8.75 g. of 2-(3,4,5- --. Column 8, line 67, for "(p-methoxphenyy)" read -- (p-methoxyphenyl) --. Column 10, line 28, for "25% aceton" read -- 25% acetone --. Column 11, line 4, for "ether weigher" read -- ether weighed --; line 64, for "poperidinocyclohexanemethanol" read -- piperidinocyclohexanemethanol --. Column 13, line 3, for "-2-hexahydro" read -- -2-(hexahydro --; line 15, for "suspensions was" read -- suspension was --. Column 14, line 54, for "heptanemthanol" read -- heptanemethanol --. Column 15, line 12, for "α-3,4,5" read -- α-(3,4,5- --. Column 16, line 6, for "piperindio" read -- piperidino --; line 18, for "temperataure" read -- temperature --; line 58, for "2.278" read -- 2.378 --; line 66, for "68 g." read -- 6.8 g. --. Column 17, line 47, for "azetropic" read -- azeotropic --. Column 18, line 18, for "α-(2pyrroli-" read -- α-(2-pyrroli- --; line 46, for "m-chlorobenzesulfonic" read -- m-chlorobenzenesulfonic --. Column 20, line 31, for "yellowy" read -- yellow --. Column 21, line 10, for "-2-hexahydro" read -- -2-(hexahydro --. Column 22, line 19, for "iin" read -- In --. Column 23, line 35, for "ethoxyphenyl-2-" read -- O-ethoxyphenyl)-2- --.

SIGNED AND
SEALED
JAN 26 1971

(SEAL)
Attest:

Edward M. Fletcher, Jr.
Attesting Officer

WILLIAM E. SCHUYLER, JR.
Commissioner of Patents